July 16, 1968    T. TROGDON    3,393,259
FOAM RUBBER METHOD

Filed Nov. 10, 1966    2 Sheets-Sheet 1

INVENTOR.
THOMAS TROGDON
BY
Reuben Wolk
ATTORNEY

July 16, 1968   T. TROGDON   3,393,259
FOAM RUBBER METHOD
Filed Nov. 10, 1966   2 Sheets-Sheet 2

INVENTOR.
THOMAS TROGDON
BY
Reuben Wolk
ATTORNEY 3,393,259
FOAM RUBBER METHOD
Thomas Trogdon, Waynesville, N.C., assignor to Dayco Corporation, Dayton, Ohio, a corporation of Delaware
Continuation-in-part of application Ser. No. 318,366, Oct. 23, 1963. This application Nov. 10, 1966, Ser. No. 600,335
7 Claims. (Cl. 264—46)

ABSTRACT OF THE DISCLOSURE

The method of making foam rubber products having segments of dissimilar densities. Dissimilar latices are introduced into different portions of a mold cavity having core pins more closely spaced to create barrier rows which separate the latices during foaming and vulcanizing.

---

This application is a continuation-in-part of application Ser. No. 318,366, filed Oct. 23, 1963, now abandoned.

This invention relates to a method for manufacturing unitary foam rubber articles, and more particularly to such articles as mattresses, pillows, furniture cushions, automobile seat cushions, and the like.

Articles of this nature are normally manufactured by the use of metal molds having upper and lower mold members, the lower member having a cavity in which the mold is partially filled with a liquid rubber latex composition that is foamable; that is, has been compounded to permit foaming. The foamed material is subsequently coagulated and vulcanized as more fully described in United States Patent No. 2,432,353, one of the series of patents which describes the so-called Talalay process. The mold cavity and upper mold member contain a number of core pins which project into the pin cavity so that the resultant product has a number of corings extending inwardly from both surfaces.

At the present time the above-described process utilizes a latex composition which is uniform so that the resultant product is uniform in density throughout. In many instances, however, it has been found desirable to provide a product which has dissimilar densities in various portions thereof. While such a process and product have been known in the past, it has only been accomplished by fabricating two dissimilar members and cementing them together as described, for example, in United States Patent No. 2,612,158. Such a method of fabrication has proved unsatisfactory, however, because of the extra time, expense and labor involved.

It is, therefore, a primary object of this invention to provide a method for the manufacture of cushioning members which are unitary, yet contain material of dissimilar density in various portions thereof.

It is a further object to provide a method for manufacturing such products by inexpensive methods.

In the practice of this invention various types of molds have been utilized in the conventional Talalay process, such as described, for example, in United States Patent No. 2,615,202. In accordance with the prior art, molds having upper and lower members and containing core pins have been previously utilized. Applicant has conceived the idea of using this apparatus for the manufacture of a product having dissimilar densities as described above, by introducing two or more latices of dissimilar densities into various portions of the mold cavity. Because of the foamable nature of these latices, they will foam within respective portions of the mold cavity and maintain separate identities during the process. In order to promote this separation of identity, the conventional apparatus is modified so that certain of the core pins in the mold cavity are increased in number to form a barrier. This is done by reducing the spacing between adjacent core pins in certain selected rows so that the resultant rows serve as barriers to prevent each of the latices from flowing out of a preselected area of the cavity, while at the same time the spacing is such that an acceptable product results. During the foaming and subsequent vulcanizing the mating edges of the foam segments will merge to form a unitary product. The invention will be more fully described in the following description and accompanying drawings, in which:

Figure 1:
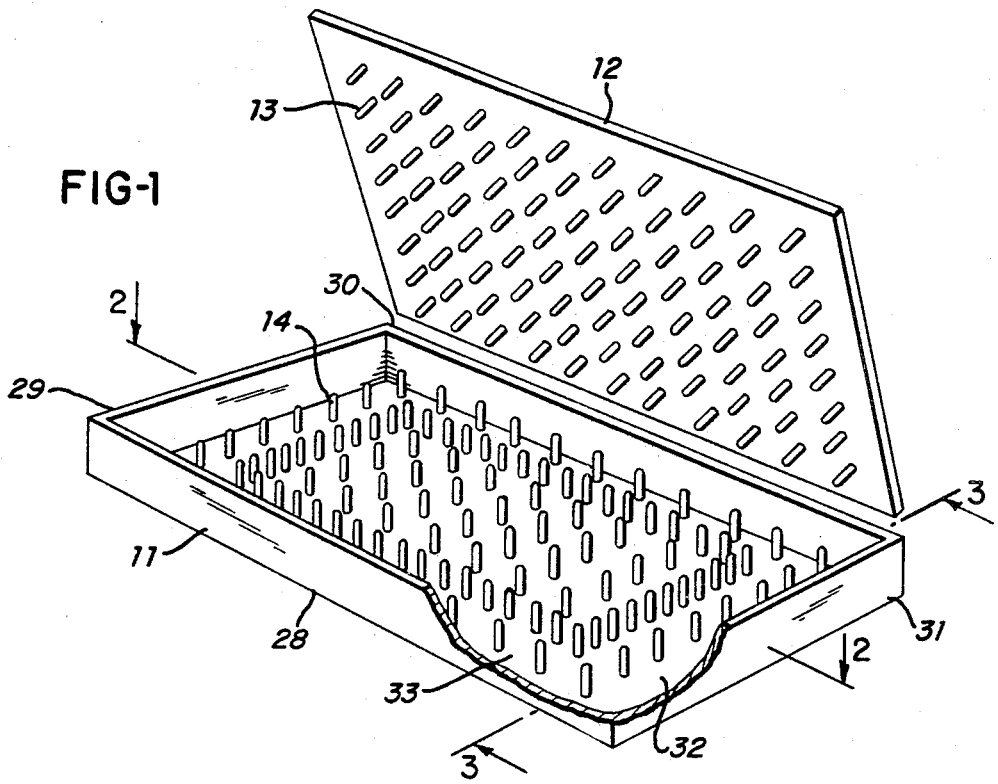
FIGURE 1 is a perspective view of a typical mold used in practicing the present invention.

Referring now to the drawings, FIGURE 1 illustrates a mold consisting of a lower mold member 11 and an upper mold member 12. The lower mold member 11 has four sides 28, 29, 30 and 31 and a base 32, all defining a cavity 33. On the upper surface of the base are mounted core pins 14. The upper mold member 12 also has core pins 13 mounted therein, adapted to close on member 11 in order to provide a completely enclosed mold during fabrication. As better shown in FIGURE 2, the core pins 14 in the mold cavity are aligned in rows in which the pins have an equal spacing. An exception to this spacing pattern, however, is found in the rows designated as 15, 16, 22 and 23, forming rows which are parallel to the periphery of the mold cavity. In these rows, which are designated as barrier rows, the spacing of the pins is reduced to approximately half of the spacing of the other rows.

Figure 3:
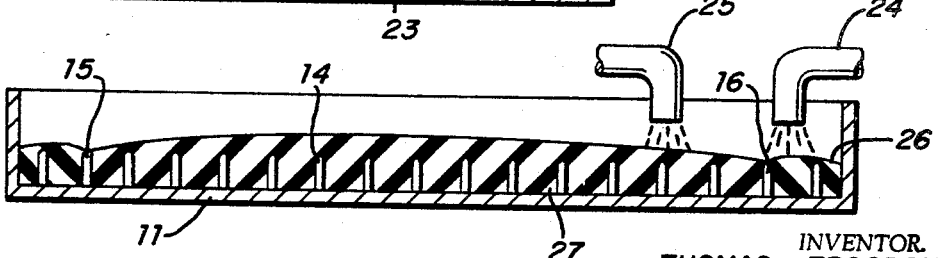
FIGURE 3 is a sectional view taking along lines 3—3 of FIGURE 1.

When it is desired to fabricate the finished product, nozzles are used to introduce liquid rubber latex into the various portions of the mold. The latex, as indicated above, is a foamable one which may be formulated in accordance with the description in the above-mentioned Patent No. 2,432,353. The density of the final product may be controlled by controlling the amount of latex which is poured into a given portion of the mold, the density increasing as a greater amount of latex is added. It is also possible to accomplish this by varying the amount of air in the latex, either by mechanical agitation or by variation of the yeast or peroxide compounded therein. Increasing the amount of entrapped air results in a reduction of density and a softer foam. As shown in FIGURE 3, nozzle 24 provides a latex 26 of a density (preferably about 0.35 gram per cubic centimeter) which provides a comparatively firm foam member. This latex is introduced into the outer peripheral portion of the mold cavity. The nozzle 25 introduces latex 27 into the remaining portion of the mold cavity; this latex has a density of approximately 0.2 gram per cubic centimeter and provides a comparatively soft foam material. The latices are separated by the barrier rows and are thus kept from flowing together and becoming intermingled. At the same time, however, there is sufficient space between the pins in these barrier rows so that the completed foam product will not be cut into a plurality of segments by the pins. As soon as the latices have been introduced, the top of the mold is closed and the subsequent process as described in the aforesaid Patent No. 2,432,353 will take place. The latices will foam into the typical stereoreticulate structure while maintaining distinct identities. As further processing continues the foaming is completed and the finished product is subsequently vulcanized. During this time the barrier rows will tend to keep the bodies of latex apart and yet the edges of the adjacent bodies will be permitted to contact each other so that a unitary product will result. The resultant product will then be a molded foam article having a comparatively firm peripheral edge and yet completely unitary.

Figure 2:
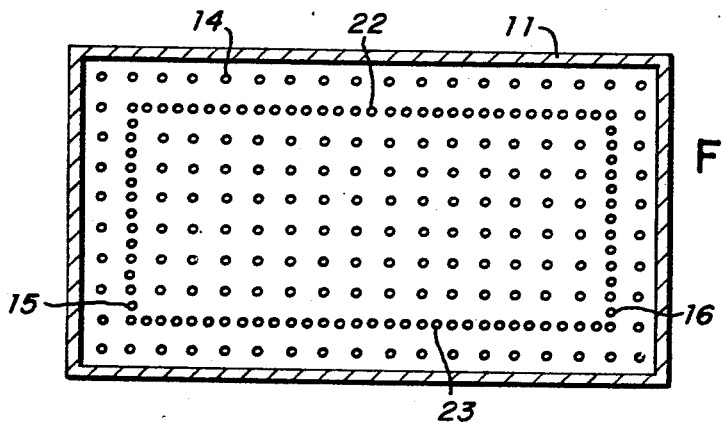
FIGURE 2 is a sectional view taken along lines 2—2 of FIGURE 1.
Figure 4:
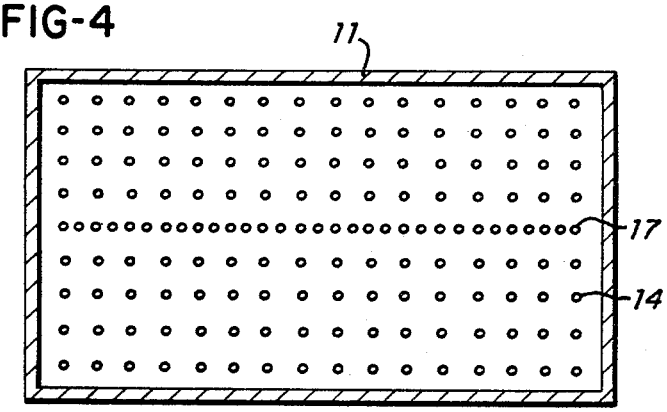
FIGURES 4, 5 and 6 are sectional views similar to FIGURE 2 illustrating further modifications of the invention.

A modified form of the invention is illustrated in FIGURE 4 in which the barrier row 17 extends along the longitudinal center line of the mold cavity instead of the peripheral configuration of FIGURES 1 and 2. The mold construction of FIGURE 4 is otherwise like that of FIGURE 1, but the barrier row 17 will be the only one having the reduced core pin spacing. By means of this mold configuration the cavity is effectively divided into two halves so that the introduction of latices of different densities into these two halves will permit the formation of a foam rubber article having dissimilar densities in the two halves, yet which is a unitary product. This process will occur exactly in the same manner as that described above with reference to the peripheral configuration.

Figure 5:
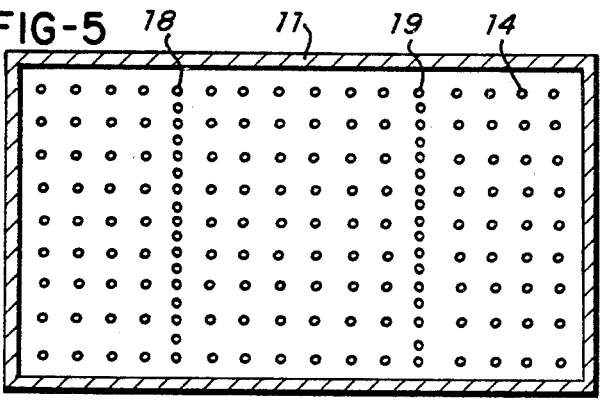

FIGURE 5 illustrates a further form of the invention in which the mold cavity contains barrier rows 18 and 19 which have the reduced spacing described above. In this case the barrier rows are located transversely of the mold cavity to define the central and end portions which are approximately equal. Of course, it is understood that the area of these segments may be any dimension in accordance with the desired end product; for example, the end portions may be smaller than the central portion. When manufacturing finished products utilizing this pattern, one latex may be introduced into the central portion and another latex into the two end portions; or three dissimilar latices may be used. In any case, the same process as described above with reference to the other configurations will take place.

Figure 6:
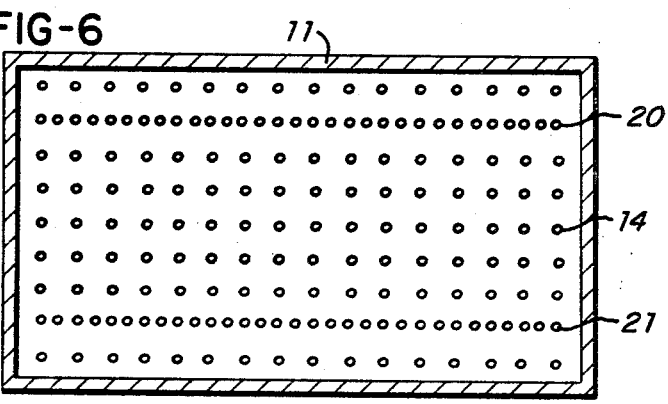

FIGURE 6 illustrates still another form of the invention in which barrier rows 20 and 21 are located longitudinally of the mold cavity to provide three longitudinal segments. The processing takes place exactly as described above, and latex of one density may be introduced into the central longitudinal portion, while latex of a dissimilar density may be introduced into the two outer longitudinal portions, or three latices of dissimilar density may be used.

Although certain forms of the invention have been described, it should be noted that other modifications are contemplated as falling within the scope of the invention. The basic principle of the invention, however, has been described in which barrier rows of core pins are located in the mold cavity to create segments of a foam material which will merge at their mating edges to create a unitary member.

What is claimed is:
1. The method of manufacturing molded unitary foam rubber articles in a mold cavity having core pins mounted therein, comprising the steps of providing barrier rows having pins spaced more closely than in the remaining rows to separate said cavity into different portions, introducing foamable rubber latex into one portion of said cavity, introducing foamable rubber latex of a different density into the remaining portion of said cavity, maintaining separate identity of said latices by means of said barrier rows, and foaming and vulcanizing said latices to form a unitary member while maintaining separate identity of the resulting foamed segments.

2. The method of claim 1 including the steps of locating a barrier row along the longitudinal center line of said mold cavity and introducing one of said latices into each portion of said cavity defined by said row.

3. The method of claim 1 including the steps of locating barrier rows parallel to the periphery of said mold cavity, introducing one of said latices into the outer peripheral portion of said cavity defined by said rows, and introducing the other of said latices into the remaining portion of said cavity.

4. The method of claim 3 in which the latex in said peripheral portion has a greater density than the latex in the remaining portion.

5. The method of claim 1 including the steps of locating barrier rows transversely of said mold cavity to define central and end portions therein, introducing one of said latices into said central portion, and introducing the other of said latices into said end portions.

6. The method of claim 1 in which the latex in said central portion has a greater density than the latex in said end portions.

7. The method of claim 1 including the step of locating at least one barrier row longitudinally of said mold cavity to define at least two longitudinal portions therein.

References Cited
UNITED STATES PATENTS

| 2,150,287 | 3/1939 | Minor | 264—46 |
| 2,432,353 | 12/1947 | Talalay | 264—54 XR |
| 3,328,847 | 7/1967 | Trogdon | 264—50 XR |

FOREIGN PATENTS

| 373,781 | 6/1932 | Great Britain. |

JAMES A. SEIDLECK, *Primary Examiner.*

PHILIP E. ANDERSON, *Examiner.*